(12) United States Patent
Smith

(10) Patent No.: US 12,117,062 B2
(45) Date of Patent: Oct. 15, 2024

(54) MONO-STRUCTURE

(71) Applicant: THREE SMITH GROUP LIMITED, Elland (GB)

(72) Inventor: Luke Smith, Halifax (GB)

(73) Assignee: THREE SMITH GROUP LIMITED, Elland (GB)

( * ) Notice: Subject to any disclaimer, the term of this patent is extended or adjusted under 35 U.S.C. 154(b) by 0 days.

(21) Appl. No.: 17/633,451

(22) PCT Filed: Jul. 31, 2020

(86) PCT No.: PCT/GB2020/051851
§ 371 (c)(1),
(2) Date: Feb. 7, 2022

(87) PCT Pub. No.: WO2021/023981
PCT Pub. Date: Feb. 11, 2021

(65) Prior Publication Data
US 2022/0252123 A1   Aug. 11, 2022

(30) Foreign Application Priority Data

Aug. 7, 2019   (GB) ...................................... 1911319

(51) Int. Cl.
*F16F 1/36* (2006.01)
*E01F 9/627* (2016.01)

(52) U.S. Cl.
CPC ............ *F16F 1/3605* (2013.01); *E01F 9/627* (2016.02); *F16F 2224/025* (2013.01)

(58) Field of Classification Search
CPC .... F16F 1/3605; F16F 2224/025; E01F 9/627
See application file for complete search history.

(56) References Cited

U.S. PATENT DOCUMENTS

| | | | |
|---|---|---|---|
| 4,429,068 A | 1/1984 | Nakahira | |
| 5,624,210 A | 4/1997 | Baldwin et al. | |
| 5,673,437 A * | 10/1997 | Chase | ................... B32B 27/304 |
| | | | 2/167 |
| 6,723,401 B1 | 4/2004 | McKnight et al. | |
| 2005/0196235 A1 | 9/2005 | Strick | |

FOREIGN PATENT DOCUMENTS

| | | |
|---|---|---|
| CN | 104276113 A | 1/2015 |
| CN | 204644909 U | 9/2015 |
| DE | 3244858 A1 | 6/1984 |
| FR | 2 669 049 A1 | 5/1992 |

(Continued)

OTHER PUBLICATIONS

Oct. 28, 2020 International Search Report issued in International Patent Application No. PCT/GB2020/051851.

(Continued)

*Primary Examiner* — Melanie Torres Williams
(74) *Attorney, Agent, or Firm* — Oliff PLC

(57) ABSTRACT

A mono-structure including a first layer and a second layer. The first layer has molecular continuity with the second layer. Each of the first layer and second layer have a characteristic mechanical property. The value of the characteristic mechanical property of the first layer is different to the value of the characteristic mechanical property of the second layer.

10 Claims, 7 Drawing Sheets

(56) References Cited

FOREIGN PATENT DOCUMENTS

| GB | 2087902   A  |   | 6/1982 |         |
|----|--------------|---|--------|---------|
| JP | 2010167786 A | * | 8/2010 | ............... B32B 5/26 |
| JP | 2012-021397 A |  | 2/2012 |         |
| JP | 2016-101691 A |  | 6/2016 |         |
| KR | 100885493 B1 |   | 2/2009 |         |
| WO | 97/21872  A1 |   | 6/1997 |         |

OTHER PUBLICATIONS

Oct. 28, 2020 Written Opinion issued in International Patent Application No. PCT/GB2020/051851.
"Hard on the Outside, Soft in the Middle". Eureka, Findlay Publications Ltd., Dartford, GB, vol. 17, No. 11, Nov. 1, 1997, pp. 41-43.
Nov. 15, 2023 Office Action issued in Chinese Applilcation 202080064606.5.
Mailed Jun. 6, 2024 Office Action issued in Japanese Application No. 2022-507372.

* cited by examiner

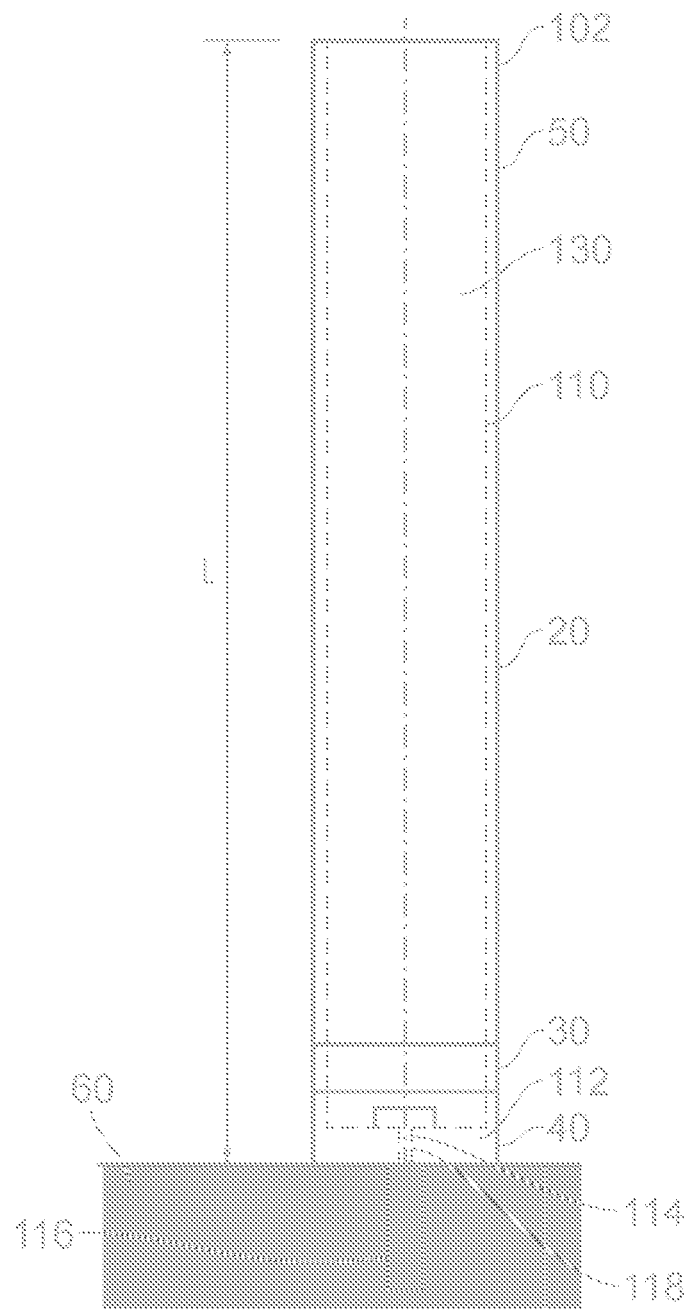

MONO-STRUCTURE

The present disclosure relates to a mono-structure.

In particular the disclosure is concerned with a mono-cast mono-structure.

BACKGROUND

Impact resistant structures are well known and have many applications. For example, dampers/bumpers may be applied to a wall in a factory to limit damage from vehicles. In one such example, dampers, bumpers and/or buffers may be applied to walls of goods loading bays to protect the loading bay from damage when vehicles reverse up to the loading bay to load or unload contents from the vehicles. Impact resistant bollards are also well known. Bumpers are applied to the front of vehicles to absorb and dissipate the energy of an impact to minimise or avoid damage to the vehicle body.

Such impact resistant structures conventionally comprise different materials, for example a plastic which consists of a single material with uniform properties supported on a metal substrate. Whilst advantageous because mechanical properties of the different components can be chosen for optimum damping performance and structural integrity, joining of dissimilar materials may introduce complications in the manufacturing process or result in an inherent weakness in the structure as, over time, the materials of the structure may tend to become separated. Once separated, the structure may fail entirely, or at least performance will be significantly reduced.

Hence an article which may provide the impact protection and/or damping capability of examples of the prior art, and improve upon them, whilst overcoming the issues of joining multiples materials of the prior art solutions, is highly desirable.

SUMMARY

According to the present disclosure there is provided a mono-structure and member as set forth in the appended claims. Other features of the invention will be apparent from the dependent claims, and the description which follows.

Accordingly there may be provided a mono-structure (10) comprising: a first layer (20) and a second layer (30), the first layer (20) having molecular continuity with the second layer (30), each of the first layer (20) and second layer (30) having a characteristic mechanical property, the value of the characteristic mechanical property of the first layer (20) being different to the value of the characteristic mechanical property of the second layer (30).

The first layer (20) characteristic mechanical property value may be substantially different to the second layer (30) characteristic mechanical property value.

The characteristic mechanical property may be one of:
a. Hardness
b. Elastic modulus;
c. Density;
d. Ultimate tensile strength;
e. Proof strength
f. Yield strength
g. Yield strain;
h. High fatigue strength, or
i. Creep strength and/or ductility.

The characteristic mechanical property may be hardness, the first layer (20) having a hardness value substantially different to the second layer (30) harness value.

The characteristic mechanical property may be elastic modulus, the first layer (20) having an elastic modulus value substantially different to the second layer elastic modulus value.

The structure may be a cast structure.

At least one of the layers may comprise a foamed region.

The layers may be made from a polymer. The layers may be made from the same polymer.

There may be provided a member (50) comprising a mono-structure according to the present disclosure.

The member (50) may be elongate and has a length (L), and the first layer (20) may have a length of at least 50% of the length (L).

The member (50) may further comprise a third layer (40), the third layer (40) spaced apart from the first layer (20) by the second layer (30), the third layer (40) integrally formed, and having molecular continuity, with the second layer (30), the third layer (40) having a characteristic mechanical property, the value of the third layer (40) characteristic mechanical property being different to the second layer characteristic mechanical property, the second layer (30) being more flexible than the first layer (20) or third layer (40) to thereby form a pivotable link between the first layer (20) and third layer (40).

The characteristic mechanical property may be hardness, and the first layer (20) may have a hardness value greater than second layer (30) hardness value, and greater than the hardness value of the third layer (40).

The characteristic mechanical property may be elastic modulus, and the first layer (20) may have an elastic modulus value greater than the second layer (30) elastic modulus value, and greater than the elastic modulus value of the third layer (40).

The member (50) may be flat, the length and breadth of the member (50) being greater than the width.

There may also be provided an impact absorbing post formed as a mono-structure.

Accordingly there may be provided an impact absorbing post (100, 102, 104) comprising a first layer (20), second layer (30) and a third layer (40) formed as a mono-structure (10) and having a length (L). The third layer (40) may be spaced apart from the first layer (20) by the second layer (30) along the length (L) of the post (100, 102, 104). The third layer (40) may be configured for being mounted to a supporting substrate (60). The second layer (30) and first layer (20) may extend in a direction away from the supporting substrate (60). The second layer (30) may be more flexible than the first layer (20) or third layer (40) to thereby form a pivotable link between the first layer (20) and third layer (40).

The first layer (20) may have molecular continuity with the second layer (30). The third layer (40) may have molecular continuity with the second layer (30). The layers (20, 30, 40) may be formed from a polymer, for example a nonlinear polymer, or a rubber.

The layers (20, 30, 40) of the post (100, 102, 104) may define a side wall (110) which defines a cavity within the post (100, 102, 104) such that the post (100, 102, 104) is hollow along at least part of its length (L).

The side wall (110) may have a thickness of at least 5 mm but no more than 30 mm.

The side wall (110) may have a thickness of at least 9 mm but not more than 15 mm.

The post (100, 102, 104) may be hollow along at least part of the length of the post (100, 102, 104) defined by the first layer (20).

The post (100, 102, 104) may be hollow along the length of the post (100, 102, 104) defined by the second layer (30).

The post (100, 102, 104) may be hollow along at least part of the length of the post (100, 102, 104) defined by the third layer (40).

The third layer (40) may be configured for being at least partly mounted in the supporting substrate (60) such that it extends from under the surface of the supporting substrate (60). The second layer (20) may have a length of at least 2%, but no more than 10% of the length (L). The third layer (20) may have a length of at least 8%, but no more than 20% of the length (L).

The second layer (20) may have a length of about 4% of the length (L). The third layer (20) may have a length of about 14% of the length (L).

The third layer (40) may be configured for being mounted onto a supporting substrate (60) such that it extends from an outer surface of the supporting substrate (60). The second layer (20) may have a length of at least 2%, but no more than 10% of the length (L). The third layer (20) has a length of at least 3%, but no more than 20% of the length (L).

The second layer (20) may have a length of about 4% of the length (L). The third layer (20) may have a length of about 6% of the length (L).

The third layer (40) may define an end wall (112) of the post (102), the end wall (112) defining a mounting feature (114) for receiving a fixing element (116) which extends through the end wall (112) into the supporting substrate (60).

The third layer (40) may comprise a plurality of mounting features (120) spaced around the side wall (110), each mounting feature (120) configured for receiving a fixing element (116) which extends into a supporting substrate (60).

Each of the first layer (20), second layer (30) and third layer (40) may have a characteristic mechanical property, the value of the characteristic mechanical property of each of the first layer (20), second layer (30) and third layer (40) being different to the other layers (20, 30, 40).

The characteristic mechanical property may be hardness, and the first layer (20) may have a hardness value greater than second layer (30) hardness value, and greater than the hardness value of the third layer (40).

The characteristic mechanical property may be elastic modulus, and the first layer (20) may have an elastic modulus value greater than the second layer (30) elastic modulus value, and greater than the elastic modulus value of the third layer (40).

Hence there is provided an impact absorbing post formed as a mono-cast mono-structure, configured to provide impact resilience, damping and/or energy absorption while retaining its structural integrity.

Hence there may be provided a mono-structure, which may be a mono-cast mono-structure, comprising at least two layers and configured to provide impact resilience, damping and/or energy absorption while retaining its structural integrity.

BRIEF DESCRIPTION OF THE DRAWINGS

Examples of the present disclosure will now be described with reference to the accompanying drawings which show examples of a mono-structure according to the present disclosure as may be used in different applications, and specifically:

FIGS. 6, 7 shows a second example of the impact-resilient post of FIG. 4;

DETAILED DESCRIPTION

Figure 1:
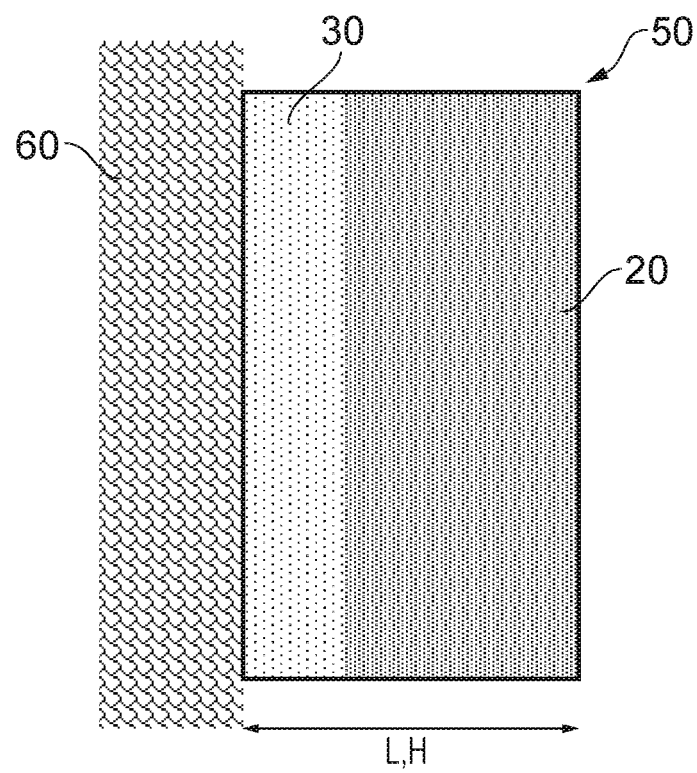
FIGS. 1, 2 show examples of a damper and/or impact-resilient members.

The present disclosure relates to a mono-structure which may be provided as an impact-resilient member 50 and/or damping member 50. The mono-structure is integrally formed from a single material. Put another way, the mono-structure is formed as one piece from a single material. The mono-structure may be cast. That is to say, the structure according to the present disclosure may be a mono-cast structure. The structure according to the present disclosure may be a monolithic structure.

FIGS. 1 to 12 show examples of a mono-structure according to the present disclosure. The term "member" is used to refer to both the impact-resilient members and damping members according to the present disclosure.

In all examples, the mono-structure 10 comprises a first layer 20 and a second layer 30. That is to say, the mono-structure 10 comprises at least the first layer 20 and second layer 30. There may also be provided a third layer 40 as shown in FIGS. 2, 4, 5 to 12. In other examples the mono-structure 10 may comprise four or more layers.

In all cases, at least some of the layers are integrally formed. That is to say, there is molecular continuity between at least some the layers. Put another way, the layers are formed as part of a continuous process such that, while the properties of one layer may differ to an adjacent or other layer in the structure, the layers form a unitary structure (i.e. a mono-structure). Hence molecules which define a region between adjacent layers form a continuous structure with both layers. That is to say, there is no join between the integrally formed (molecularly continuous) layers. Put another way, the mono-structure of the present disclosure may be defined as a unitary structure with regions (herein described as sections, volumes and/or layers) having different characteristic mechanical properties. The layers are made of the same material in so far as the constituent parts of the material of the different layers are the same, although the constituent parts may be present in different concentrations in some layers compared to other layers to thereby introduce differences in the properties (for example characteristic mechanical property) of the layers.

Each of the layers may be defined by a characteristic mechanical property. In examples in which there are only two integrally formed layers, the value of the characteristic mechanical property of the section (i.e. volume) of material which forms the first layer 20 is different the value of the characteristic mechanical property of the section (i.e. volume) of the material which forms the second layer 30. In examples in which there more than two layers (as shown in FIGS. 2, 4, 5 to 12) the value of the characteristic mechanical property of the section (i.e. volume) of the material which forms one layer is different to the characteristic mechanical property of the section (i.e. volume) of the material which forms at least one of the other layers. In such an example, the value of the characteristic mechanical property of the sections (i.e. volumes) of the material which forms two or more layers, but not all layers, may be the same. In a further example, the value of the characteristic mechanical property may be different for each layer.

The material may be, and/or comprise, a polymer, for example a nonlinear polymer, or a rubber.

Figure 3:
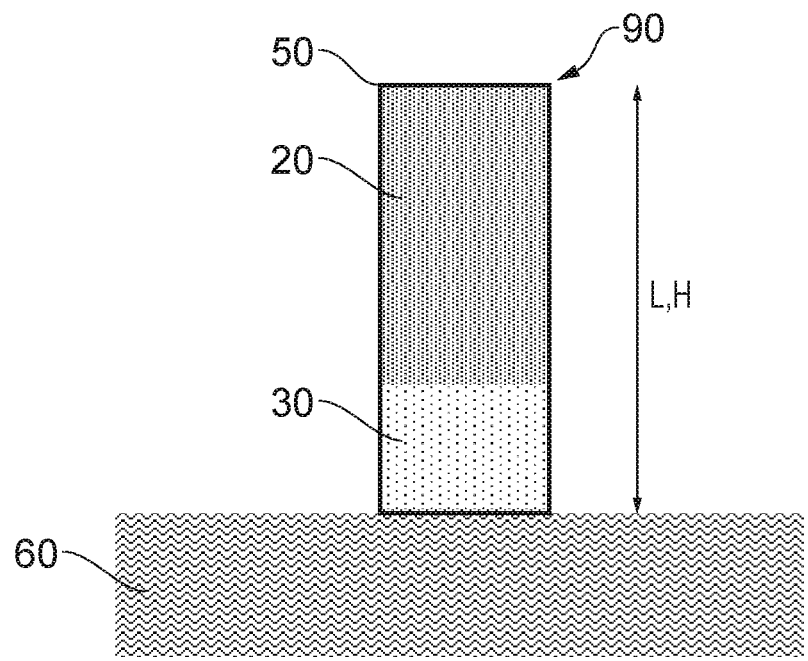
FIGS. 3, 4 show schematic examples of an impact-resilient member provided as a post.

Hence in the example shown in FIGS. 1, 3 the first layer 20 is integrally formed with the second layer 30. That is to say, the first layer 20 has molecular continuity with the second layer 30. Put another way, the section (i.e. volume) of the material which forms the first layer 20 has molecular continuity with the section (i.e. volume) of the material which forms the second layer 30. Both the first layer 20 and second layer 30 may be made from the same material. The first layer 20 and second layer 30 may be made of the same material in so far as the constituent parts of the material of the first layer 20 and second layer 30 are the same, although the constituent parts may be present in different concentrations in the first layer 20 compared to the second layer 30.

The section (i.e. volume) which defines the first layer 20 has a characteristic mechanical property which is substantially different to the value of the characteristic mechanical property for the section (i.e. volume) of which defines the second layer 30.

The members 50 may be provided in any appropriate geometry. For example, in the examples shown in FIGS. 1, 2 the member 50 may be cubic or cylindrical and/or elongate. In other examples the member 50 may be configured as a sheet (e.g. having a thickness substantially less than its length and breadth). That is to say the member 50 may be flat, the length and breadth of the member 50 being greater than the width.

In every example, the member 50 has a length "L" (which may also be termed a height "H", depending on its orientation) being a dimension which encompasses all of the layers of the member 50. The first layer 20 may be over 50% of the length "L", the remainder of the length L being made up of the remaining layer or layers.

Figure 2:
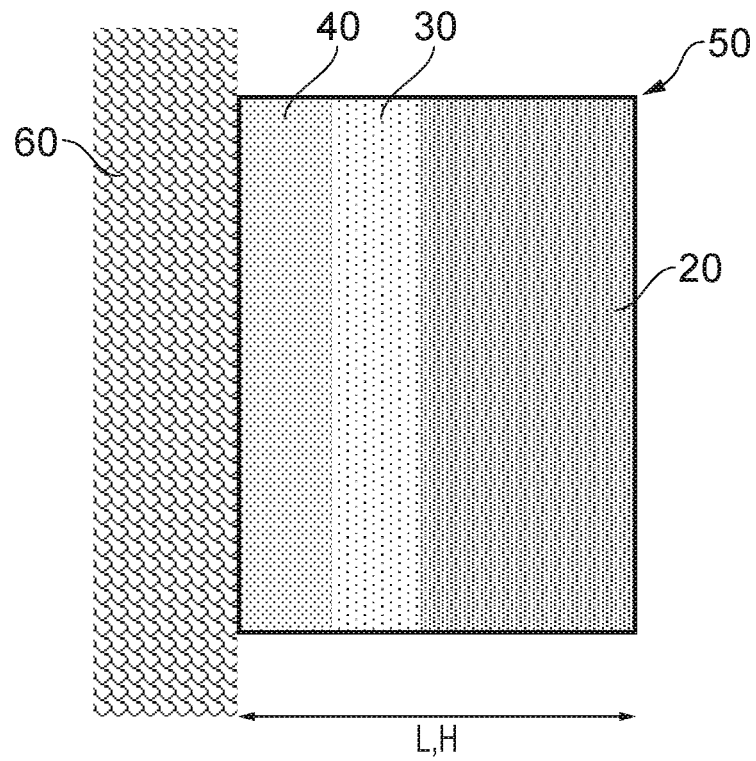
Figure 4:
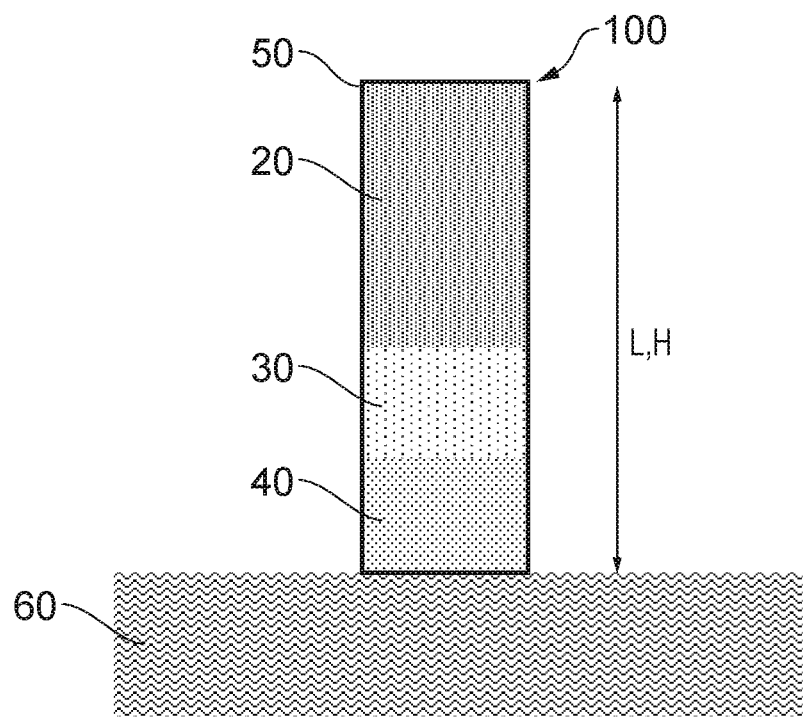

For example, as shown in the examples of FIGS. 2, 4 the member 50 comprises a third layer 40, the third layer 40 being spaced apart from the first layer 20 by the second layer 30. In such an example, at least 50% of the length "L" of the member 50 is comprised of the first layer 20, the remainder comprising the second layer 30 and the third layer 40. The second layer 30 may be longer, shorter or the same length as the third layer 40. The third layer 40 is integrally formed from the same material as, and having molecular continuity with, the second layer 30. The third layer 40 has a characteristic mechanical property, the value of the third layer characteristic mechanical property being different to the value of the value of the second layer characteristic mechanical property.

The characteristic mechanical property may be one of hardness, elastic modulus, density, ultimate tensile strength, proof strength, yield strength, yield strain, high fatigue strength, or creep strength and/or ductility.

The first layer 20 may have a characteristic mechanical property value substantially greater than the second layer 30 characteristic mechanical property value. The first layer 20 may have a characteristic mechanical property value substantially smaller than the second layer 30 characteristic mechanical property value.

The first layer 20 may have a characteristic mechanical property value substantially greater than the second layer 30 characteristic mechanical property value, and the first layer 20 characteristic mechanical property value may be substantially greater than the characteristic mechanical property value of the third layer 40, the second layer 30 characteristic mechanical property value being lower than the third layer 40 characteristic mechanical property value.

The first layer 20 may have a characteristic mechanical property value substantially lower than the second layer 30 characteristic mechanical property value, and the first layer 20 characteristic mechanical property value may be substantially lower than the characteristic mechanical property value of the third layer 40, the second layer 30 characteristic mechanical property value being greater than the third layer 40 characteristic mechanical property value.

In an example in which the characteristic mechanical property is hardness, the first layer 20 may have a hardness value substantially different to the second layer 30 hardness value. For example, the first layer 20 may have a hardness value substantially greater than the second layer 30 hardness value. The hardness values of the layers may differ by at least 5%. The first layer 20 may have a hardness value which is at least 5% greater than the second layer 30 hardness value.

In an alternative example, the first layer 20 may have a hardness value substantially less than the second layer 30 hardness value. The first layer 20 may have a hardness value which is no greater than 95% of the second layer 30 hardness value.

In an example in which the characteristic mechanical property is elastic modulus, the first layer 20 may have an elastic modulus value substantially different to the second layer 30 elastic modulus value. For example, the first layer 20 may have an elastic modulus value substantially smaller than the second layer 30 elastic modulus value.

In an alternative example in which the characteristic mechanical property is elastic modulus, the first layer 20 may have an elastic modulus value substantially greater than the second layer 30 elastic modulus value.

The first layer 20 may have a hardness value substantially greater than the second layer 30 hardness value, and greater than the hardness value of the third layer 40. Alternatively or additionally, the first layer 20 may have an elastic modulus value substantially greater than the second layer 30 elastic modulus value, and greater than the elastic modulus value of the third layer 40.

The first layer 20 may have a hardness value substantially smaller than the second layer 30 hardness value, and smaller than the hardness value of the third layer 40. Alternatively or additionally, the first layer 20 may have an elastic modulus value substantially smaller than the second layer 30 elastic modulus value, and smaller than the elastic modulus value of the third layer 40.

The first layer 20 may have a hardness value substantially greater than the second layer 30 hardness value, and the first layer 20 hardness value may be substantially greater than the hardness value of the third layer 40, the second layer 30 hardness value being lower than the third layer 40 hardness value.

The first layer 20 may have a hardness value of about 60 on the shore D hardness scale.

The second layer 30 may have a hardness value of about 90 on the shore A hardness scale.

The third layer 40 may have a hardness value of about 95 on the shore A hardness scale.

Alternatively or additionally, the first layer 20 may have an elastic modulus value substantially greater than the second layer 30 elastic modulus value, and the first layer 20 elastic modulus value may be substantially greater than the elastic modulus value of the third layer 40, the second layer 30 elastic modulus value being lower than the third layer 40 elastic modulus value.

Hence for example, in the examples shown in FIGS. 1 to 4, the first layer 20 may be harder, and/or have a higher elastic modulus, than the second layer 30.

Where the examples of FIGS. 1, 2 are provided as dampers or impact-resilient members, the first layer 20 provides a protective layer (i.e. is harder and less flexible than the second layer 30) and the second layer 30 provides the majority of the damping/flexibility/energy absorption to thereby protect a substrate 60 to which (in use) the member is attached.

In the example of FIG. 1, the second layer 30 may be adhered to the substrate 60, i.e. with a chemical bond, a mechanical bond (for example fixtures) or by provision of co-operating features on the second layer 30 and substrate 60 so that they are held together (for example a tongue and groove, or such like, arrangement).

In the example of FIG. 2, the third layer 40, which may be harder and/or less flexible (i.e. have a higher value of elastic modulus) than the second layer 30, may be bolted, or otherwise fixed to the substrate 60, for example in the same way as the second layer 30 may be fixed to the substrate 60 in the example of FIG. 1.

Hence the examples of FIGS. 1, 2 may be suitable for protecting the walls 60 of a goods loading bay (i.e. of a factory or retailer) from impact damage from a vehicle, or may be used as a bumper for a vehicle or other application where it is advantageous for a substrate 60 to be protected from an impact.

Figure 9:
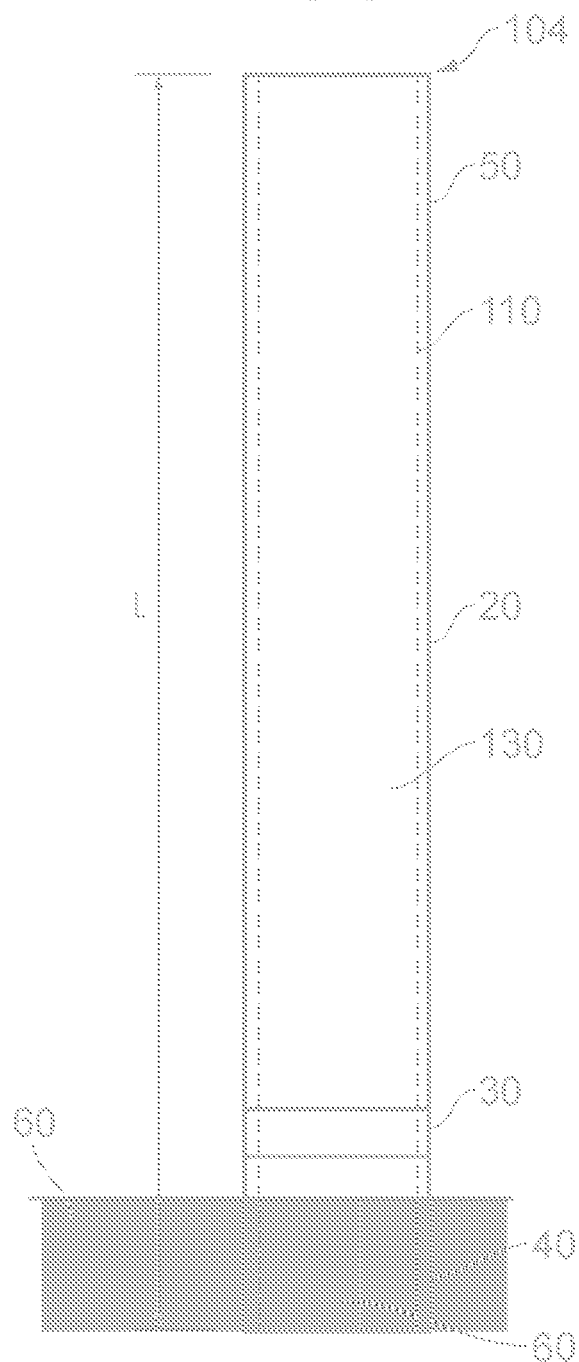

In the examples of FIGS. 3, 4 the impact-resilient member may be provided as a post 90, 100, for example a bollard, with either two layers as shown in FIG. 3, or three layers as shown in FIG. 4. The post 90, 100 may be fixed to the ground using an adhesive, or by some mechanical fixture, for example as described in relation to the examples of FIGS. 1, 2, or as described in relation to the examples of FIGS. 5 to 7, 10 below. Alternatively, as shown in FIG. 9, the post may be in part embedded in the substrate 60. In such an example, the second layer 30 is produced to be more flexible than the first layer 20 and/or third layer 40 (where present), such that it forms a pivotable link between the first layer 20 and the substrate 60.

Thus, in the example of FIG. 3, the second layer 30 provides a hinge between the first layer 20 and the substrate 60. In the example of FIGS. 4 to 10, the third layer 40 is harder/has a higher elastic modulus than the second layer 30 and hence provides a rigid anchor to the substrate 60. In this example the second layer 30, being more flexible than the first layer 20 or third layer 40, forms a pivotable link/hinge between the first layer 20 and the third layer 40.

FIGS. 5 to 10 show different examples of the post/bollard 100 of FIG. 4.

In the Figures, the different layers are shaded/hatched differently to indicate the presence of the three different layers. However in all examples, all three layers may be visibly identical. That is to say, they may all be provided with the same external colour and texture, with no visible transition between the layers.

Figure 5:
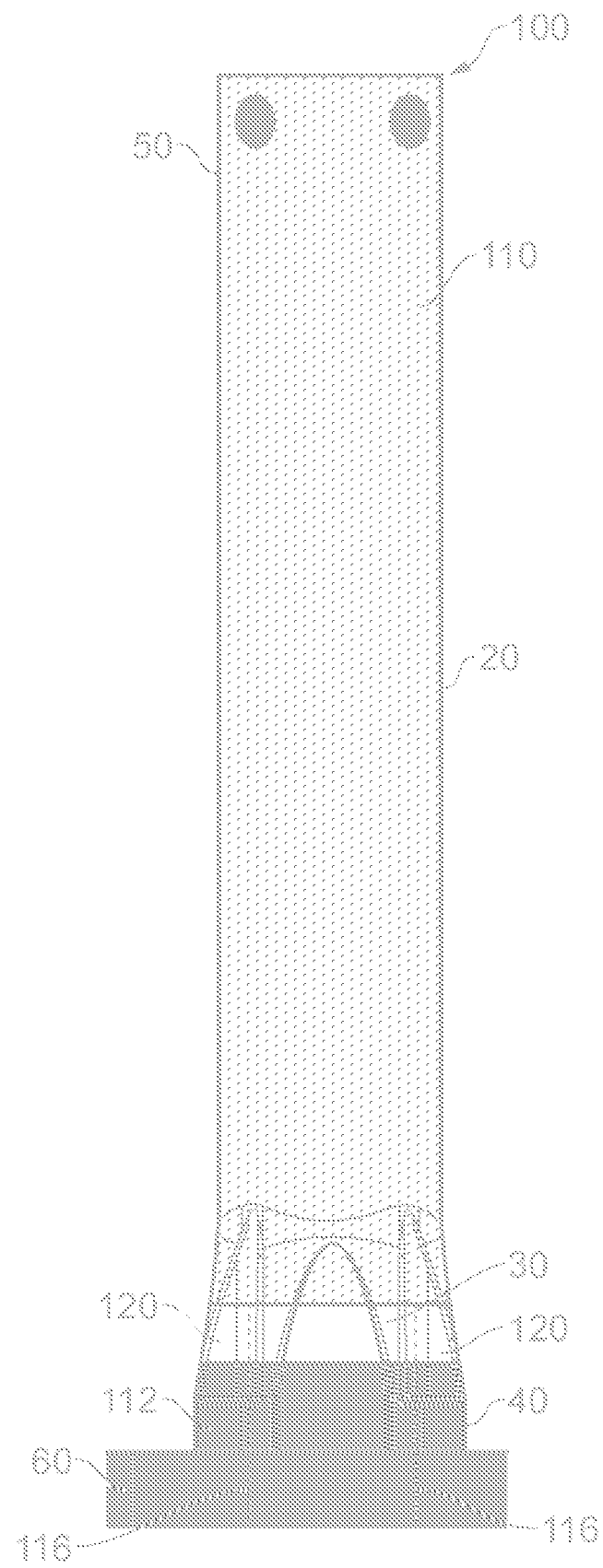
FIG. 5 shows a first example of the impact-resilient post of FIG. 4.
Figure 8:
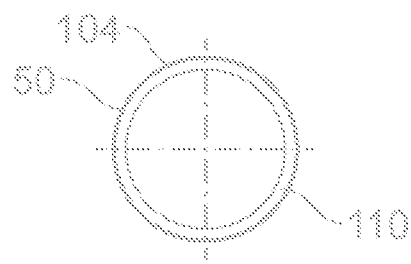
FIGS. 8, 9 show a third example of an impact-resilient post of FIG. 4.
Figure 10:
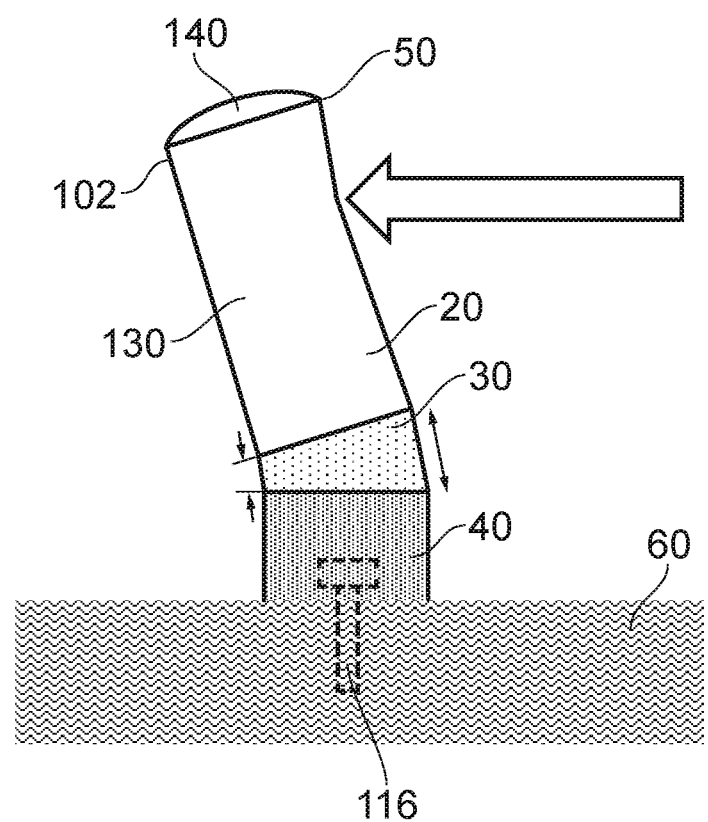
FIG. 10 shows the post of FIGS. 4, 6, 7, and similar posts of FIGS. 5, 8, 9, in a deformed state.

FIG. 5 shows a side view of a first example 100 of the impact-resilient post of FIG. 4, which may be substantially cylindrical. FIGS. 6, 7 show an end view and side view respectively of a second example 102 of the impact-resilient post of FIG. 4. FIGS. 8, 9 show an end view and side view respectively of a third example 104 of the impact-resilient post of FIG. 4. FIG. 10 shows the post 102 of FIGS. 6, 7 in operation (which is identical to the mode of operation of the examples of FIGS. 5, 8, 9).

In all of the examples of FIGS. 5 to 10, the post/bollard 100, 102, 104 comprises a first layer 20, second layer 30 and a third layer 40 formed as a mono-structure 10 and having a length L.

The third layer 40 is spaced apart from the first layer 20 by the second layer 30 along the length L of the post 100, 102, 104. In each example, the third layer 40 is configured for being mounted, anchored and/or fixed to and/or into a supporting substrate 60. That is to say, the third layer 40 is configured (e.g. shaped and have suitable structural integrity and physical properties) to be fixed to a supporting substrate 60 (i.e. an area of ground, a floor of a building, man made surface—for example a concrete, tarmac surface, resin, ceramic or hard core structure, or other suitable foundation material).

Thus, in use, the third layer 40 is fixed to an appropriate substrate 60, and the second layer 30 and first layer 20 extend in a direction away from the supporting substrate 60 to provide an obstruction, barrier and/or marker for vehicles and other moving objects.

As described previously, and described below in more detail with respect to FIG. 10, the second layer 30 is more flexible than the first layer 20 or third layer 40 to thereby form a pivotable link between the first layer 20 and third layer 40. Thus, when struck (for example by a vehicle) the first layer 20 can move relative to the third layer 40 by virtue of the pivotable link provided by the second layer 30. The first layer 20 and third layer 40 may also deform during the impact.

Also as described previously, the first layer 20 has molecular continuity with the second layer 30, the third layer 40 has molecular continuity with the second layer 30. The layers 20, 30, 40 of the posts 100, 102, 104 may be formed from a polymer, for example a nonlinear polymer, or a rubber.

Also as described previously, each of the first layer 20, second layer 30 and third layer 40 of the posts 100, 102, 104 have a characteristic mechanical property, the value of the characteristic mechanical property of each of the first layer 20, second layer 30 and third layer 40 being different to the other layers 20, 30, 40.

The layers 20, 30, 40 of the post examples 100, 102, 104 of FIGS. 5 to 10 define a side wall 110 which defines a cavity 130 within the post 100, 102, 104 such that the post 100, 102, 104 is hollow along at least part of its length (L). The examples of FIGS. 2, 3 may likewise be hollow.

The side wall 110 may have a thickness of at least 5 mm but no more than 30 mm. The side wall 110 may have a thickness of at least 9 mm but not more than 15 mm. The side wall 110 may have a thickness of about 11 mm, 11.5 mm or 12 mm.

The posts 100, 102, 104 of the examples of FIGS. 5 to 10 may have an external diameter of at least 100 mm but no more than 300 mm substantially along the whole length of the post 100, 102, 104.

The posts 100, 102, 104 of the examples of FIGS. 5 to 10 may have an external diameter of at least 150 mm but no more than 250 mm substantially along the whole length of the post 100, 102, 104.

The posts 100, 102, 104 of the examples of FIGS. 5 to 10 may have an external diameter of about 180 mm, 190 mm or 200 mm along substantially along the whole length of the post 100, 102, 104.

In the examples of FIGS. 6, 7, 10 and FIGS. 8, 9 the external diameter of the post is substantially constant along the whole length of the post 102, 104.

In the example of FIG. 5 the external diameter of the post may be substantially constant along the majority of the length of the post 102, 104, with the post increasing in maximum diameter towards the end of the post 100 comprising the third layer 40.

In the example of FIG. 5 the external diameter may be substantially constant along at least 80%, but not more than 90%, of the length of the post 102, 104, with the post increasing in maximum external diameter towards the end of the post 100 comprising the third layer 40.

In the example of FIG. 5 the external diameter may be substantially constant along at about 85% of the length of the post 102, 104, with the post increasing in maximum external diameter towards the end of the post 100 comprising the third layer 40.

In the examples of FIGS. 5 to 10 the post 100, 102, 104 may be hollow along at least part of the length of the post 100, 102, 104 defined by the first layer 20. In the examples of FIGS. 5 to 10 the post 100, 102, 104 may be hollow along the length of the post 100, 102, 104 defined by the second layer 30. In the examples of FIGS. 5 to 10 the post 100, 102, 104 may be hollow along at least part of the length of the post 100, 102, 104 defined by the third layer 40.

In the examples of FIGS. 8, 9 the post 100, 102, 104 may be hollow along the entire length of the post 104, the side wall 110 defining a hollow tube, which may be open at both ends.

In the examples of FIGS. 5 to 18 a cap 140 (shown in FIG. 10) may be provided to cover and/or seal the end of the post 100, 102, 104 defined by the first layer 20, and hence close the cavity 130.

In the example shown in FIGS. 5, 6, 7, 10 the third layer 40 is configured for being at least partly mounted onto the supporting substrate 60. That is to say, in the example shown in FIGS. 5, 6, 7, 10 the third layer 40 is configured for being mounted onto an outer surface (i.e. the surface facing upwards) of the supporting substrate 60. That is to say, in these examples, the third layer 40 is configured for being mounted onto a supporting substrate 60 such that it extends from, but not into, an outer surface of the supporting substrate 60. Hence there may be provided a structure comprising a substrate 60 and a post 100, 102 according to the present disclosure.

In the example of FIGS. 5, 6, 7, 10 the third layer 40 defines an end wall 112 of the post 102, the end wall 112 defining a mounting feature 114 for receiving a fixing element 116 (for example a bolt, rivet, pin or other fixing member) which extends through the end wall 112 into the supporting substrate 60 to hold the post 102 in place.

In the example of FIG. 5 the mounting feature 114 the third layer 40 comprises a plurality of mounting features 120 spaced around the side wall 110, each mounting feature 120 configured for receiving a fixing element 116 (shown as a dotted line) which, in use, extends into a supporting substrate 60 to hold the post in place. The mounting features 114 define the region which increases in diameter towards the end having the third layer 40. The mounting feature 114 may be provided as bosses, a flange or flanges, with an appropriate number of passages, each of which are configured to receive a fixing element 116.

In the example of FIGS. 6, 7, 10 the mounting feature 114 is a passage 118 for receiving a fixing element 116 which extends through the end wall 112 into the supporting substrate 60. The passage 118 may be provided in the geometric centre of the end wall 112, which may be aligned with a central axis of the post 102.

In the examples of FIGS. 5, 6, 7, 10 the second layer 20 may have a length of at least 2%, but no more than 10% of the length (L), and the third layer 20 may have a length of at least 3%, but no more than 20% of the length (L). The second layer (20) may have a length of about 4% of the length (L), and the third layer 20 may have a length of about 6% of the length (L).

In a non limiting example, the length L of the post 102 in the examples of FIGS. 6, 7, 10 may be about 1275 mm, the second layer 30 having a length of about 50 mm and the third layer having a length of about 75 mm.

In the example shown in FIGS. 8, 9, the third layer 40 is configured for being at least partly mounted in the supporting substrate 60. Hence, in use, the third layer 40, or at least part of the length of the third layer 40, may be immersed, sunken, buried and/or cast into the substrate 60. Hence there may be provided a structure comprising a substrate 60 and a post 104 according to the present disclosure. Hence, when in situ, the third layer 40 may extend from under the surface of the supporting substrate 60. In examples in which the post 104 is hollow along its length, and open at least at the end defined by the third layer 40, material of the substrate 60 may thus partly extend along the inside of the post 104 to assist with keying the post 104 in place, for example if the substrate is concrete, tarmac or some other hardening medium.

In the example shown in FIGS. 8, 9, the second layer 20 may have a length of at least 2%, but no more than 10% of the length (L), and the third layer 20 may have a length of at least 8%, but no more than 20% of the length (L). The second layer 20 may have a length of about 4% of the length (L), and the third layer 20 may have a length of about 14% of the length (L).

In a non limiting example, the length L of the post 104 in the examples of FIGS. 8, 9 may be about 1275 mm, the second layer 30 having a length of about 50 mm and the third layer having a length of about 175 mm.

Hence, in use, the third layer 40, or part thereof, may immersed, sunken, buried and/or cast into the substrate 60. Hence there may be provided a structure comprising a substrate 60 and a post 104 according to the present disclosure. Hence, when in situ, the third layer 40 may extend from under the surface of the supporting substrate 60.

FIG. 10 shows how the arrangements of FIGS. 5 to 9 respond to an impact, where the impact is shown by an arrow. The figures most closely resembles the arrangement of FIGS. 6, 7, with a central bolt 116 holding the post 102 to a substrate 60. However the mode of operation of all of the examples of FIGS. 3, 4, 5 to 9 are the same, however mounted.

As hereinbefore described, the second layer 30 is produced to be more flexible than the first layer 20 and/or third layer 40, such that the second layer 30 forms a pivotable link between the first layer 20 and the substrate 60. Hence in operation, when the post 100, 102, 104 is struck by an object (for example a vehicle) on the first layer 20, then the second layer 30 is put into tension on the side of the impact, and put into compression on the side opposite the impact, thereby allowing the first layer 20 to pivot (i.e. be angled) relative to the third layer 40 and/or substrate 60. The first layer 20 may be deformed by the impact, and to a lesser extent, so may the third layer 40.

In examples in which the material of the posts 100, 102, 104 comprise, a polymer, for example a nonlinear polymer, or a rubber, when the impact is over, and the object (e.g. vehicle) moved away from the post 100, 102, 104, the first layer 20, second layer 30 and third layer 40 resume their original shapes and relative orientations.

Figure 11:
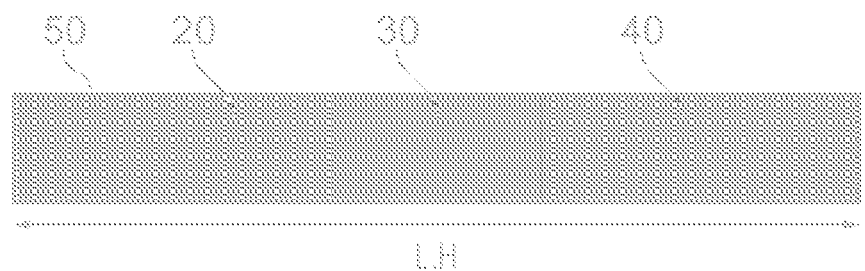
FIGS. 11, 12 show examples of the impact-resilient member of the present disclosure provided as an elongate member.
Figure 12:
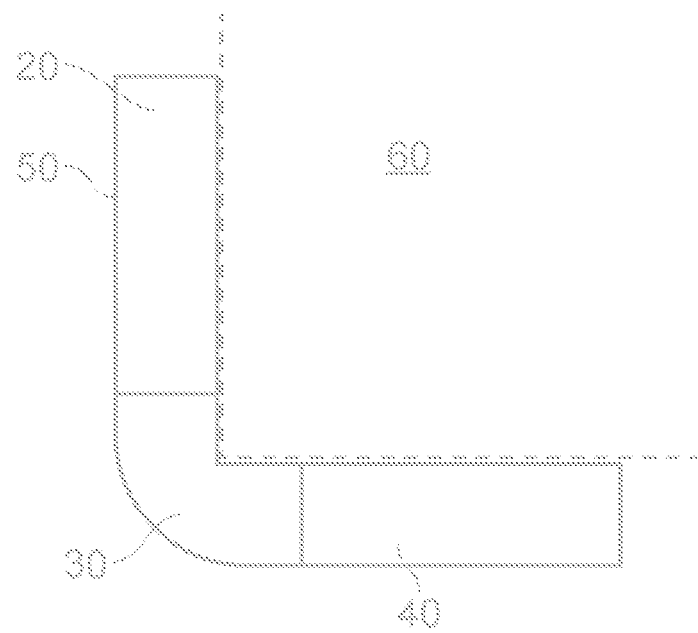

In the example of FIGS. 11, 12 the impact-resilient member 50 is provided as an elongate member, where the value of the characteristic mechanical property of the first layer 20 and third layer 40 are the same but differ to that of the second layer 30 sandwiched therebetween. Hence the characteristic mechanical property of the second layer 30 is chosen such that it has more flexibility than, and hence provides a hinge between, the first layer 20 and the third layer 40. In this application, the member 50 may be applied to a substrate 60 having a corner, as shown in FIG. 12, such that it can be bent around the corner, the second layer 30 protecting the corner of the substrate. The first layer 20 and third layer 40 are configured to be applied to the walls which define the corner and hence, in use, are at an angle to one another (for example at right-angles to one another as shown in FIG. 12). Thus the first layer 20 and third layer 40 provide impact damage protection and the second layer 30 provides additional damping and protection of the corner as well as allowing for the member 50 to be bent around and fixed easily to the substrate 60. This means that the impact-resilient member 50 can be provided in one piece and screwed, bonded or otherwise fixed to the substrate 60 in one step, rather than needing to be assembled.

As described above, the structure may be a cast structure. That is to say, the mono-structure may be manufactured by a casting process and thus the material properties and/or mechanical properties of the layers may be influenced by the cast structure manufacturing process.

In an example in which the mono-structure is not a cast structure, but manufactured, for example by an injection moulding technique, at least one of the layers may comprise a foamed region.

Although the mono-structure is formed as one piece from a single material, it will be appreciated that the mono-structure may form part of a product, where the product comprises other layers or materials added to the mono-structure, for example labels, graphics, fixtures and fittings.

Hence there is provided a monolithic member 50 configured to be fitted to a substrate to either help protect the substrate (as shown in FIGS. 1, 2, 11, 12) or as a barrier which uses the substrate as an anchor (for example as shown in FIGS. 3 to 10). The fact that the impact-resilient member comprises a mono-structure, which may be a mono-cast mono-structure, means that it can be provided to a user and fitted in place without the need for assembly. This simplifies manufacture, shipping and installation. Additionally a member 50 according to the present disclosure has a better structural integrity (i.e. less likely to come apart, for example, delaminate) than examples of the related art.

The absolute and/or relative thickness of the walls and/or layers of the posts of the examples of FIGS. 5 to 10 are chosen to provide a range of responses to impact, depending on the physical response required by the post. Depending on the application, if the value chosen is too low, then the structure will not have the desired effect. Too thick and the post will bend/yield too much and hence not resist with sufficient force.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A member comprising a mono-structure provided as an impact-resilient member, wherein the mono-structure is integrally formed from a single polymer material in that constituent parts of the polymer material throughout the mono-structure are the same, and comprises:
    a first layer integrally formed with a second layer, and
    a third layer spaced apart from the first layer by the second layer, wherein:
        the first layer has molecular continuity with the second layer;
        the first and second layers are formed from the single polymer material in that the constituent parts of the polymer material of the first and second layers are the same, while the constituent parts of the polymer material are present in different concentrations in the first layer as compared to the second layer, such that the polymer material of the first layer has a different value of a characteristic mechanical property than a value of the characteristic mechanical property of the polymer material of the second layer,
        the third layer has molecular continuity with the second layer,
        the third layer has a characteristic mechanical property,
        a value of the characteristic mechanical property of the third layer is different than a value of the characteristic mechanical property of the second layer,
        the second layer is more flexible than the first layer or third layer to thereby form a pivotable link between the first layer and third layer, and
        the characteristic mechanical property is hardness, and the first layer has a hardness value greater than the hardness value of the second layer, and greater than the hardness value of the third layer.

2. The member as claimed in claim 1, wherein the structure of the mono-structure is a cast structure.

3. The member as claimed in claim 1, wherein at least one of the layers comprises a foamed region.

4. The member as claimed in claim 1, wherein
    the member is elongate and has a length, and
    the first layer has a length of at least 50% of the length.

5. The member as claimed in claim 4, wherein
    the member is flat, the length and breadth of the member being greater than the width.

6. A member comprising a mono-structure provided as an impact-resilient member, wherein the mono-structure is integrally formed from a single polymer material in that constituent parts of the polymer material throughout the mono-structure are the same, and comprises:

a first layer integrally formed with a second layer, and a third layer spaced apart from the first layer by the second layer, wherein:

the first layer has molecular continuity with the second layer;

the first and second layers are formed from the single polymer material in that the constituent parts of the polymer material of the first and second layers are the same, while the constituent parts of the polymer material are present in different concentrations in the first layer as compared to the second layer, such that the polymer material of the first layer has a different value of a characteristic mechanical property than a value of the characteristic mechanical property of the polymer material of the second layer, the third layer has molecular continuity with the second layer, the third layer has a characteristic mechanical property, a value of the characteristic mechanical property of the third layer is different than a value of the characteristic mechanical property of the second layer, the second layer is more flexible than the first layer or third layer to thereby form a pivotable link between the first layer and third layer, and the characteristic mechanical property is elastic modulus, and the first layer has an elastic modulus value greater than the second layer elastic modulus value, and greater than the elastic modulus value of the third layer.

7. The member as claimed in claim 6, wherein the structure of the mono-structure is a cast structure.

8. The member as claimed in claim 6, wherein at least one of the layers comprises a foamed region.

9. The member as claimed in claim 6, wherein
the member is elongate and has a length, and
the first layer has a length of at least 50% of the length.

10. The member as claimed in claim 9, wherein
the member is flat, the length and breadth of the member being greater than the width.

\* \* \* \* \*